Patented May 22, 1923.

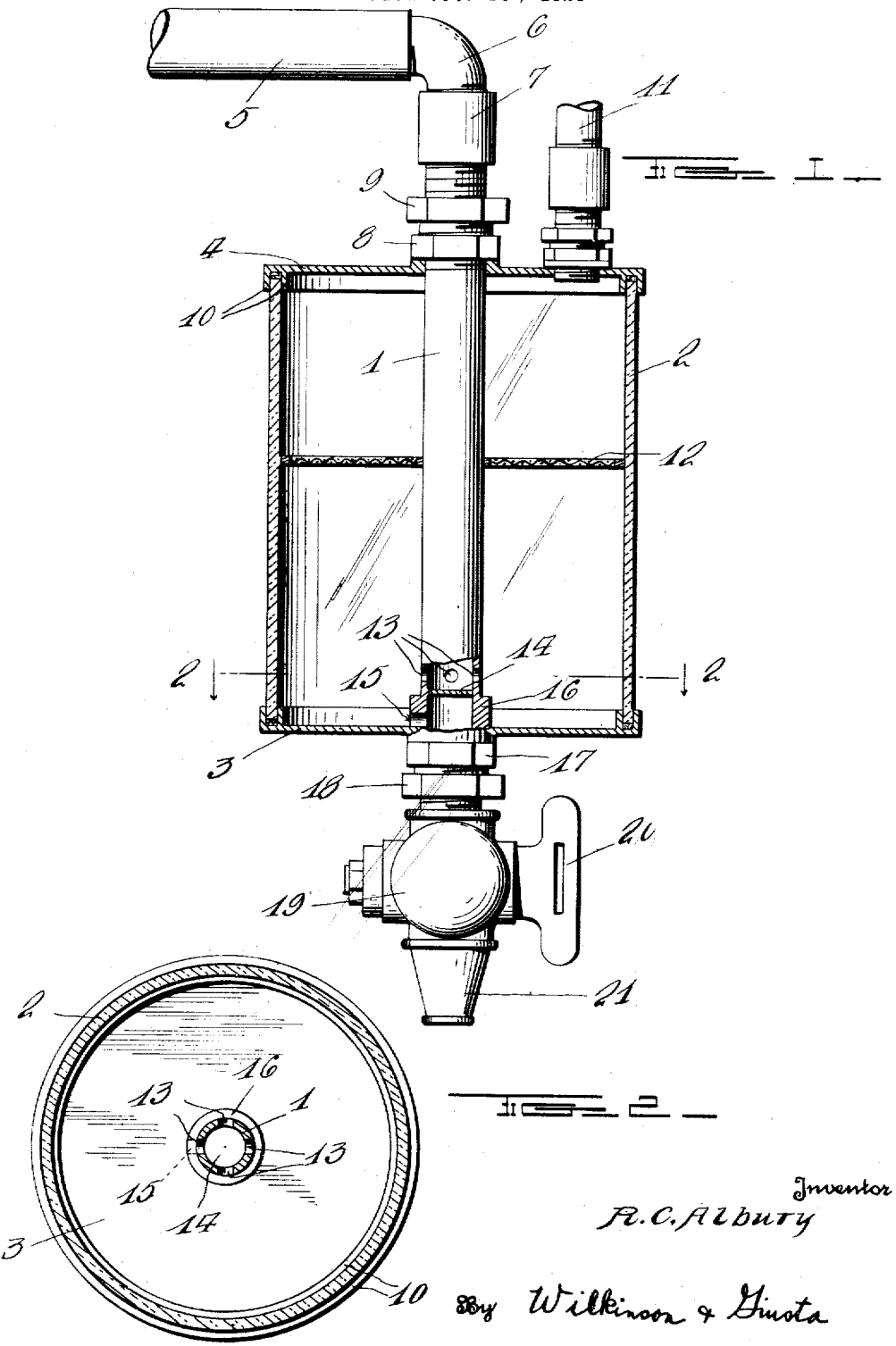

1,456,352

UNITED STATES PATENT OFFICE.

ROBERT CELEY ALBURY, OF TAMPA, FLORIDA.

GASOLINE GAUGE AND STRAINER.

Application filed October 10, 1921. Serial No. 506,683.

*To all whom it may concern:*

Be it known that I, ROBERT C. ALBURY, a citizen of the United States, residing at Tampa, in the county of Hillsborough and State of Florida, have invented certain new and useful Improvements in Gasoline Gauges and Strainers; and I do hereby declare the following to be a full, clear, and exact description of the invention, such as will enable others skilled in the art to which it appertains to make and use the same.

The present invention relates to improvements in gasoline gauges and strainers and has for an object to provide an improved device which will show the condition of the feeding of gasoline to an internal combustion engine, at the same time straining the liquid and providing for the removal of water and sediment which is precipitated to the bottom of the liquid column.

Another object of the invention resides in providing an improved gauge and strainer in which the foreign particles will be effectively removed from the gasoline or other fuel before the same is passed on to the carbureter, and in which an inspection will at all times be permitted of the progress of the separation.

A further object of the invention resides in providing an improved strainer and guage of simple and inexpensive parts and construction capable of ready dis-assembly to allow of access to the interior for cleaning.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a vertical sectional view with parts shown in elevation of an improved gasoline gauge and strainer constructed according to the present invention; and, Fig. 2 is a horizontal sectional view taken on the line 2—2 in Fig. 1.

Referring more particularly to the drawings, 1 designates a central pipe in communication with a source of gasoline or other liquid fuel supply and which is disposed vertically within a glass or other transparent cylinder 2 forming with lower and upper heads 3 and 4 respectively, a guage and straining tank or receptacle. The pipe 1 for instance may be placed in connection with the vacuum tank on an automobile by the use of a conduit 5 which is coupled to an elbow 6 above the pipe 1 and above the receptacle or tank.

A union 7 provides for connecting the lower branch of the elbow 6 to the upper end of the pipe 1 which projects a suitable distance above the upper head 4. This upper projecting portion of the pipe 1 is threaded for a suitable distance as illustrated to take the nuts 8 and 9, of which the latter is a lock nut to hold its companion 8 in place after adjustment against the upper side of the head 4.

The heads 3 and 4 are provided with spaced in turned flanges 10 to receive there between the edges of the glass cylinder 2, suitable packing if desired being placed therein to avoid leakage. The upper head 4 is also perforated to receive a pipe 11 for conveying off the filtered gasoline, suitable nuts or other device being employed to hold the pipe on the head, it being understood that the open or receiving end of the pipe 11 is in communication with the upper portion of the receptacle or tank 2, or at least above the filtering screen or cloth 12, which in the instance shown, is made to surround the pipe 1 and to lie horizontally across and divide the lower from the upper portion of the tank or receptacle.

The gasoline enters the tank or receptacle through a number of perforations 13 made in the lower portion of the pipe 1 at a slight elevation above the bottom of the tank or in other words above the lower head 3. Just below these perforations 13 is a diaphragm 14 closing the pipe 1 interiorly and forming a partition between the perforations 13 and a vent 15 also made in the pipe 1 substantially at the bottom of the tank or receptacle to afford an outlet for water or other foreign matter which will by gravity precipitate to the bottom of the tank or receptacle. The lower portion of the pipe 1 is preferably formed with a boss or enlargement 16 to form an abutment for the interior side of the lower head 3.

A nut 17 is threaded on the lower extension of the pipe 1 beyond the head 3 and takes against the outer surface thereof to bind such head against the abutment 16. A lock nut 18 is provided in conjunction with the nut 17 after a customary fashion. On the lower end of the bottom extension of the pipe 1 is a drain cock 19 having a hand wheel 20 to open and close the same, and a drip spout 21.

In the use of the device, gasoline from the vacuum tank on its way to the carburetor will be led by the conduit 5 into the pipe 1 and, descending in the latter, will find its way through the series of radiating ports 13 out into the lower portion of the tank or receptacle confined within the glass cylinder 2. Owing to the relatively great cubic capacity of the tank or receptacle as compared with that of the pipe 1, the liquid column of gasoline in the former will be relatively quiet and it is intended that the gasoline or other liquid fuel be led in through the perforations 13 only slowly to avoid disturbance in the fuel in the tank or receptacle. The liquid in this quiet condition will cause a precipitation of all foreign particles to the bottom and the water entrapped in the gasoline likewise will separate out and will, being heavier, fall by gravity to the bottom.

The screen or filter 12, through which the fuel must rise on its way out of the pipe 11, will also aid this separating action and will effectually avoid any of the water or foreign particles from getting into the carbureter.

The device may be placed in any suitable location below vacuum tank or supply of fuel. The glass cylinder 2 will permit the inspection of the progress of the action at all times and it will be apparent when any interruption in the flow occurs. It will also show when the screen or filter 12 becomes clogged and the heads may be removed to permit of access thereto for the purpose of cleaning.

An observer may further know when sediment and water is collected at the base of the receptacle or tank in such large quantities as to make it desirable to withdraw it. The valve handle 20 may be opened to permit of the sediment and water draining through the port 15 and the lower extension of the pipe 1, the partition 14 preventing the descent of the gasoline.

It will be appreciated from the foregoing that an improved gauge and strainer is provided for fuel in which the progress of the action may be at all times observed and any trouble likely to be encountered by fuel encumbered with water or sediment is entirely eliminated. Moreover, the sediment and water may be quickly and fully withdrawn as it accumulates without waste of the fuel and when desirable the parts may be separated to permit of cleaning the filter and other parts.

It is obvious that various changes and modifications may be made in the details of construction and design of the above specifically described embodiment of this invention without departing from the spirit thereof, such changes and modifications being restricted only by the scope of the following claims.

What is claimed is:

1. A gasoline gauge and strainer comprising a container having an outlet at its upper portion, an inlet pipe extending down through the container and having discharge openings spaced above its lower end and above the bottom of the container for conveying the material to be filtered into such container, said inlet pipe having a partition extending completely there across beneath said discharge openings and separating the portions of the pipe above and below said partition, said position extending above the bottom of the container, said inlet pipe also having a drain opening at substantially the bottom of the container leading to the portion of the pipe below said partition, and filtering means in the container, substantially as described.

2. A gauge and strainer for gasoline and the like comprising a container having a transparent wall, heads connected to the ends of said wall, an inlet pipe passing centrally through the heads, an inlet pipe for coupling the heads upon the container, said inlet pipe having a discharge opening through its side wall above its lower end communicating with the interior of the container, a partition in said pipe beneath the discharge opening and above the base of the container for completely separating the portions of the pipe above and below said partition, said pipe having a drain opening through its side wall at approximately the level of the bottom of the container, said drain opening leading to the portion of the pipe below said partition, a strainer extending across the intermediate portions o the container, and an outlet pipe communicating with the top head of the container, substantially as described.

ROBERT CELEY ALBURY.